United States Patent
Vitaladevuni et al.

(10) Patent No.: US 9,589,560 B1
(45) Date of Patent: Mar. 7, 2017

(54) ESTIMATING FALSE REJECTION RATE IN A DETECTION SYSTEM

(71) Applicant: Amazon Technologies, Inc., Reno, NV (US)

(72) Inventors: Shiv Naga Prasad Vitaladevuni, Cambridge, MA (US); Bjorn Hoffmeister, Seattle, WA (US); Rohit Prasad, Acton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 354 days.

(21) Appl. No.: 14/135,309

(22) Filed: Dec. 19, 2013

(51) Int. Cl.
   *G10L 15/01* (2013.01)

(52) U.S. Cl.
   CPC .................... *G10L 15/01* (2013.01)

(58) Field of Classification Search
   None
   See application file for complete search history.

(56) References Cited

U.S. PATENT DOCUMENTS

| | | | | |
|---|---|---|---|---|
| 6,223,155 | B1* | 4/2001 | Bayya | G10L 15/07 704/243 |
| 6,799,162 | B1* | 9/2004 | Goronzy | G10L 15/063 704/244 |
| 7,216,077 | B1* | 5/2007 | Padmanabhan | G10L 15/065 704/240 |
| 7,219,055 | B2* | 5/2007 | Lucke | G10L 15/07 704/203 |
| 2002/0107695 | A1* | 8/2002 | Roth | G10L 15/22 704/275 |
| 2003/0050783 | A1* | 3/2003 | Yoshizawa | G10L 15/065 704/270.1 |
| 2003/0216916 | A1* | 11/2003 | Navratil | G10L 17/06 704/250 |
| 2003/0220791 | A1* | 11/2003 | Toyama | G10L 15/20 704/256.3 |
| 2004/0059576 | A1* | 3/2004 | Lucke | G10L 15/07 704/256.7 |
| 2004/0193411 | A1* | 9/2004 | Hui | G10L 15/20 704/233 |

(Continued)

OTHER PUBLICATIONS

Rahim, Mazin G., Chin-Hui Lee, and Biing-Hwang Juang. "A study on robust utterance verification for connected digits recognition." The Journal of the Acoustical Society of America 101.5 (1997): 2892-2902.*

(Continued)

*Primary Examiner* — Pierre-Louis Desir
*Assistant Examiner* — Jonathan Kim
(74) *Attorney, Agent, or Firm* — Knobbe, Martens, Olson & Bear, LLP (57) ABSTRACT

Features are disclosed for estimating a false rejection rate in a detection system. The false rejection rate can be estimated by fitting a model to a distribution of detection confidence scores. An estimated false rejection rate can then be computed for confidence scores that fall below a threshold. The false rejection rate and model can be verified once the detection system has been deployed by obtaining additional data with confidence scores falling below the threshold. Adjustments to the model or other operational parameters can be implemented based on the verified false rejection rate, model, or additional data.

21 Claims, 5 Drawing Sheets

(56) References Cited

U.S. PATENT DOCUMENTS

| | | | |
|---|---|---|---|
| 2004/0230105 A1* | 11/2004 | Geva | A61B 5/04012 600/301 |
| 2005/0144187 A1* | 6/2005 | Che | G10L 15/26 |
| 2006/0287856 A1* | 12/2006 | He | G10L 15/063 704/256 |
| 2007/0192101 A1* | 8/2007 | Braho | G10L 15/065 704/251 |
| 2007/0219801 A1* | 9/2007 | Sundaram | G10L 17/04 704/270 |
| 2009/0055360 A1* | 2/2009 | Morris | G06F 17/30749 |
| 2011/0288862 A1* | 11/2011 | Todic | G10L 15/05 704/235 |
| 2011/0307253 A1* | 12/2011 | Lloyd | G10L 15/20 704/233 |
| 2012/0291111 A1* | 11/2012 | Kamakura | G06F 21/32 726/7 |
| 2013/0225128 A1* | 8/2013 | Gomar | H04W 12/06 455/411 |
| 2013/0268270 A1* | 10/2013 | Jiang | G10L 15/07 704/236 |
| 2013/0275135 A1* | 10/2013 | Morales | G10L 15/065 704/236 |
| 2013/0325448 A1* | 12/2013 | Levien | G10L 19/00 704/201 |
| 2015/0073795 A1* | 3/2015 | Tan | G10L 15/063 704/243 |
| 2015/0161370 A1* | 6/2015 | North | G07C 9/00158 726/5 |

OTHER PUBLICATIONS

Rahim (Rahim, Mazin G., Chin-Hui Lee, and Biing-Hwang Juang. "A study on robust utterance verification for connected digits recognition." The Journal of the Acoustical Society of America 101.5 (1997): 2892-2902.).*

* cited by examiner

ESTIMATING FALSE REJECTION RATE IN A DETECTION SYSTEM

BACKGROUND

Computing devices can be used to recognize faces, voices, handwriting, and other objects, patterns and the like. In a typical implementation, a computing device can continuously monitor a particular input stream (e.g., a video stream from a video camera or an audio stream from a microphone), or receive a batch of similar input data. The computing device can determine whether a portion of the input is likely to contain information corresponding to the target item, object, or pattern to be detected. For example, the computing device can determine whether a particular portion of the input stream is likely include to any face, any speech, or any handwriting at all. Once this preliminary determination has been made, the computing device can then perform other processing or cause other processing to be performed. For example, the computing device may perform recognition of which particular face, voice or other target is present in the input, rather than detecting that any face/voice/etc. is present in the input.

A user experience with such a detection system can be defined in terms of performance latencies and detection errors, such as false positives and false negatives. Detection systems may use the concept of a confidence score when detecting the target item, object, or pattern. Higher confidence in the detection can be reflected by a higher confidence score, while loser confidence in the detection can be reflected by a lower confidence score. The detection system may use a confidence score threshold to determine when the target has been detected and additional processing should therefore occur.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

The present disclosure relates to determining a false rejection rate in a detection system. Various adjustments can be implemented to the detection system based on the false rejection rate. The adjustments may be designed to reduce the false rejection rate, improve detection accuracy, or otherwise improve the overall user experience. Generally described, detection systems, such as systems configured to detect the presence of a face in video input or speech in audio input, can determine how likely it is that a given input includes the detection target (e.g., any face or any speech). Inaccuracy in the detection (e.g., false positives or false negatives) can have a negative impact on a user's experience with the system, and therefore system developers typically try to minimize the incidence of such false positives and false negatives while preserving other desirable operational characteristics of the system. In some implementations, detection is the first step in a process that uses detected faces/speech/etc. For example, a detection system may be configured to detect the presence of a particular spoken word or phrase in a continuous audio input stream. Such a word may be referred to as a "wake word." The wake word may be used by a user to indicate that the user is addressing the system and a spoken query or command will follow. When the wake word is detected, the subsequent utterance can be processed by an automatic speech recognition ("ASR") system to recognize the speech and initiate other processing responsive to the spoken query or command. Performing ASR on all speech in the input stream to detect the wake word and also recognize the remainder of the utterance can be expensive computationally, especially in comparison with detections systems such as dedicated keyword spotters.

Detection systems may calculate detection scores (e.g., confidence scores, likelihoods, probabilities, etc.) reflecting the likelihood that input includes the detection target (e.g., the wake word). A false acceptance may occur when the score exceeds some operational threshold (e.g., a detection threshold) even though the wake word was not spoken. The user utterance that follows the erroneously detected wake word may be processed by the ASR system, and some undesirable action may be performed (e.g., playback of media may be stopped even though the user was not addressing the device with a wake word and a subsequent command to stop playback.). A false rejection may occur when the detection score falls short of the detection threshold even though the input actually does include the wake word to be detected. In such a case, the user's subsequent query or command is not acted upon because the audio input of the user utterance is not provided to the ASR system for processing. False rejections that occur too often can negatively impact the user's experience and the perceived performance of the entire system.

False acceptances may be detected by, e.g., annotating the input associated with a detection score exceeding the detection threshold. For example, a user device may include detection functionality, and input that passes the preliminary detection step may be provided to a network-based server for ASR processing and other computationally intensive or network-based processing. Humans may examine (e.g., listen to) the input (or random instances of input) and check for the presence of the wake word to determine whether there was a false acceptance by the detection system. One issue in measuring false rejections in such network-based implementations is that only input associated with a detection score exceeding the detection threshold is provided to the server. Input associated with detection scores falling short of the detection threshold is not provided to the server. By definition, false rejections are rejections of input that falls short of the detection threshold, which is not provided to the network server and therefore cannot be annotated. The detection threshold cannot be set arbitrarily low to capture input associated with such false rejections because that can cause a high false acceptance rate and negatively impact the user's experience.

One method of measuring the actual false rejection rate is to provide the server with the input that crosses a low "catch all" or "transmit" threshold for annotation, while maintaining the separate (higher) detection threshold for input that is to be acted upon by the server. This can reduce or eliminate the negative impact on the user experience and false acceptance rate that accompanies the arbitrarily low detection threshold described above. The frequency with which the wake word is present in utterances that pass the "catch all" threshold but fall short of the detection threshold can be calculated, providing an estimate of the overall false rejection rate. However, such an approach may not be desirable for a number of reasons. For example, privacy concerns may weigh against using this approach because the server is receiving a large amount of audio data from the user when the user is not intending to address the system. As another example, a large amount of additional data may need to be annotated, which can be a time consuming and expensive process. As a further example, uploading a large amount of data that likely does not include device-directed speech can consume valuable bandwidth, which can cost users money and/or interfere with other network-based applications.

Aspects of the present disclosure relate to estimating the false rejection rate for a given detection system by accounting for instances of the detection target in input that does not cross a detection threshold for detection scores. The techniques described herein also avoid uploading or saving large volumes of input data below the detection threshold. In some embodiments, a model of the detection score distribution can be generated for input that includes the detection target (e.g., the wake word) and input that does not include the detection target. For example, training data may be generated or obtained. The training data may include input captured under (or synthesized to approximate) the environmental conditions and other conditions under which the detection system is expected to operate (e.g., various users in various environments speaking utterances, some of which include the wake word and some of which do not). The detection system may process the training data input and generate detection scores associated with the likelihood that each input includes the wake word. A distribution for all detection scores can be generated, including both true positives (e.g., input that includes the wake word) and true negatives (e.g., input that does not include the wake word). A model can be fit to the distribution to represent the distribution as, e.g., a Gaussian, Poisson, sigmoid, or the like. Because the correct output for each piece of training data input is known, probabilities for both true positives and true negatives can be determined, and models of the individual components may be generated. The false rejection rate can be determined by integrating the distribution for the true positive detection scores from negative infinity to the detection threshold, as described in greater detail below. This integration provides the overall rate of true positives from the training data that are associated with detection scores below the detection threshold, and would therefore be falsely rejected by the detection system.

Additional aspects of the present disclosure relate to validating the models described above and in greater detail below after the detection system has been deployed to actual users. In order to avoid the limitations and concerns described above with respect to the low catch-all threshold, a small amount of input data that falls short of the detection threshold may be provided to the server for annotation. In some embodiments, a separate transmit threshold may be determined that provides a statistically significant amount of additional data beyond the data that meets or exceeds the detection threshold. However, the transmit threshold may also be determined such that it is not a low "catch-all" threshold that results in substantially all audio of user utterances being transmitted to the server. Furthermore, in some embodiments the transmit threshold may not be used permanently, but rather for short periods of time. The periods of time may be periodic, random, selected based on some performance criteria, etc. The additional data collected during the annotation periods can be annotated and used to validate the model. For example, if the additional portion of overall distribution that is known via the additional annotated data matches the model distribution, then the model may be deemed validated.

Further aspects of the present disclosure relate to implementing adjustments based on the false rejection rate. If model for detection score distributions is invalidated or the false rejection rate exceeds some threshold or is otherwise unsatisfactory, then adjustments to various portions of the system may be implemented. In some embodiments, the model for detection score distributions may be modified or replaced. For example, parameters of the model distribution of detection scores for true positive samples can be adjusted to better model the observed distribution. In other embodiments, the detection threshold may be modified. For example, if the false rejection rate is unusually high, the detection threshold may be lowered (or a separate transmit threshold may be activated) to capture more input for processing and/or annotation at the server. In additional embodiments, variable threshold configurations may be implemented. For example, different users may use the detection system at different times or on different days. In such cases, various parameters of the detection system, such as the detection threshold or detection score distribution model, may be customized for the different users. As another example, the detection threshold, transmit threshold, or some other parameter of the detection system may be changed based on the context, such as during the first few seconds of playback of a requested song, etc. In still further embodiments, one or more detection models used by the detection system to detect an event in an input sample (e.g., to detect a keyword in an audio sample) can be modified based on the false rejection rate.

Aspects of the embodiments described in the present disclosure will focus, for the purpose of illustration, on a client device that transmits data to a networked spoken language processing system for processing when confidence in detection of a wake word exceeds a threshold. However, the systems and techniques described herein may be used in any number of processes or applications for detecting events in samples of data, including face detection, handwriting detection, and other detection and/or recognition systems. As used herein, a sample of data can include any relevant portion of data, such as several seconds of audio, an image or portion of an image of a person, and so forth. In addition, although certain examples and embodiments will be described with respect to confidence scores, the systems and techniques described herein may be applied to any type of detection score, including likelihoods, probabilities, etc. Various aspects of the disclosure will now be described with regard to certain examples and embodiments, which are intended to illustrate but not limit the disclosure.

Distribution Modeling

Figure 1:
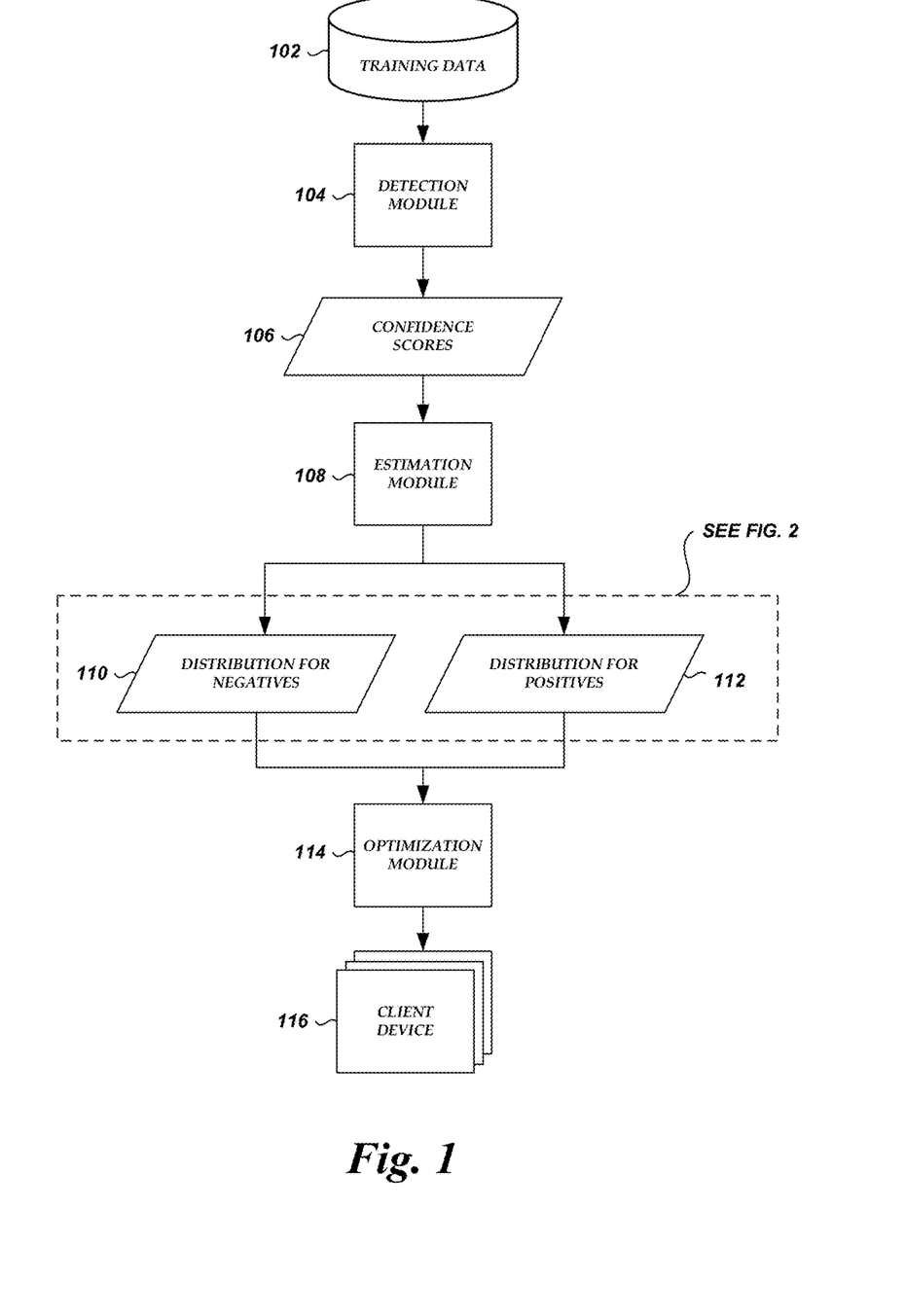
FIG. 1 is a block diagram of illustrative data flows that occur in some embodiments of confidence score modeling.

With reference to an illustrative embodiment, FIG. 1 shows the data flows between various modules and components of a system used to model confidence scores generated by a detection system, such as a wake word detection system. The distribution models generated by the modules and components illustrated in FIG. 1 can be used to predict and verify the number of false negatives that are not passed on to another system (e.g., the number of false rejections). In some embodiments, thresholds (e.g., detection thresholds or transmit thresholds) may be determined or adjusted using the models in light of other operational characteristics of the system as a whole. For example, it may not be desirable to almost completely eliminate false rejections because, in doing so, the number of false positives that are passed on to another system (e.g., the number of false acceptances) may become unacceptably high, the process or bandwidth requirements may become unacceptably high, privacy may be compromised, etc.

In operation, training data from a training data store 102 can be input to a detection module 104 that will be used in the deployed system (e.g., in client devices used in customer homes, workplaces, and the like). One example of a detection module that may be used is described in commonly-owned U.S. patent application Ser. No. 13/711,510 filed on Dec. 11, 2012 and incorporated herein by reference in its entirety. The detection module 104 can generate confidence scores 106 from the training data. The training data can include sample audio data input representing any number of utterances spoken by various users (e.g., users with different vocal characteristics and speech patterns), containing various words and phrases (e.g., some may include the wake word and a sample spoken command, others may include speech that is not directed at the device), spoken in various environments (e.g., different room configurations, different background noise provides), and the like. In addition, the training data may include labels or other indicators regarding whether each audio sample is a true positive or a true negative. In some embodiments, targeted training data may be used, such as training data for particular environments, particular vocal characteristics, etc. The detection module 104 can process training data input to generate confidence scores 106 representing the likelihood that the input data includes the word to be detected.

The estimation module 108 can use the confidence scores 106 to generate a model of the distribution of confidence scores for the true positives and true negatives. Once such a model has been determined, the false rejection rate can be estimated. In some embodiments, the detection threshold can be selected and other system parameters can be determined to provide an optimal or improved user experience.

The distribution of confidence scores 106 at this stage includes both true positives (the input that actually includes the wake word) and true negatives (the input that does not include the wake word). The distribution can be represented by a Bayesian equation. For example, the probability of observing a wake word detection confidence score h for a given input sample (whether positive or negative) is given by:

$$p(h)=p(h|y=1)p(y=1)+p(h|y=0)p(y=0) \quad [1]$$

where y=1 indicates that the sample is a true positive and y=0 indicates that the sample is a true negative. In this view, p(h) is observed before the detection threshold and without determining whether each individual sample is a true positive or a true negative.

One approach to inferring the individual contributions is to model the conditional probabilities to have a specific functional form (e.g., Normal distribution) and associated parameters (e.g., mean and standard deviation in case of Normal distribution). In general, equation [1] can be rewritten as:

$$p(h)=p(h|\lambda_1;y=1)p(y=1)p(\lambda_1)+p(h|\lambda_0;y=0)p(y=0)p(\lambda_0) \quad [2]$$

where p(y=1) and p(y=0) are the prior probability distributions (e.g., "priors") of true positives or true negatives, respectively (e.g., on observing a wake word or not), as determined from the training data that includes labels or other indicia of whether each sample is a true positive or true negative. $p(\lambda_1)$ and $p(\lambda_0)$ are the priors on the model parameters. Maximum likelihood estimation may be used to fit the model parameters to the given probability distribution.

Figure 2:
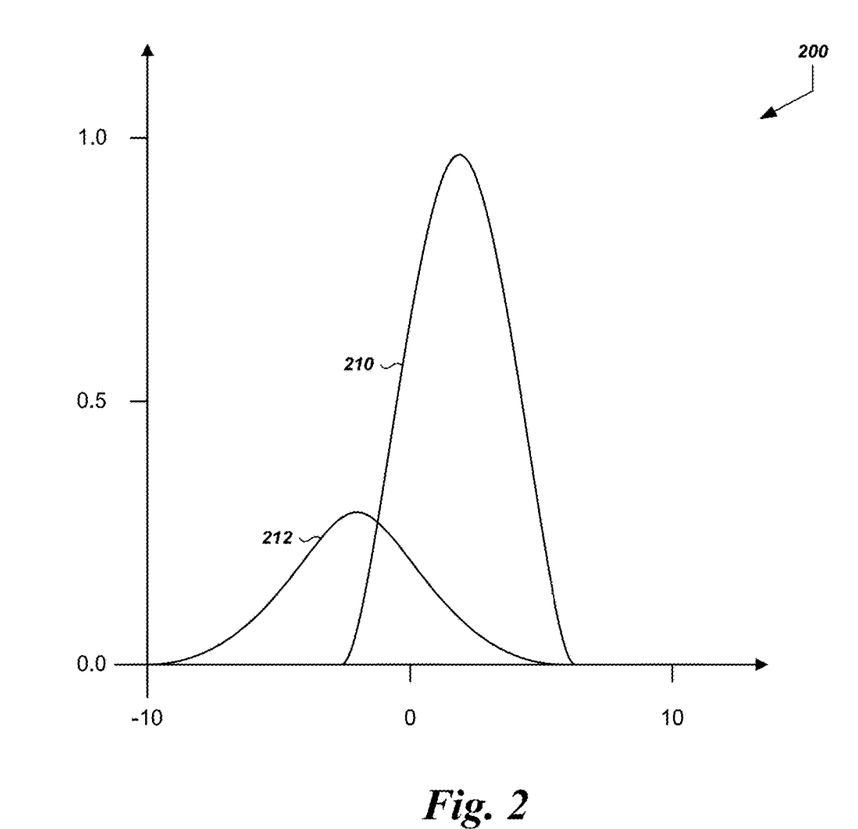
FIG. 2 is a graph of illustrative confidence score distributions computed in some embodiments.

In one example, if the confidence scores are modeled using a Normal distribution, then equation [2] can be rewritten as:

$$p(h)=N(h,\mu_1,\sigma_1)p(\mu_1,\sigma_1|y=1)p(y=1)+N(h,\mu_0,\sigma_0)p(\mu_0,\sigma_0|y=0)p(y=0) \quad [3]$$

where $\mu_1$ and $\sigma_1$ are parameters (e.g., mean and standard deviation) of the Normal distribution N of confidence scores for true positives (e.g., when y=1), and $\mu_2$ and $\sigma_2$ are parameters of the Normal distribution N of confidence scores for true negatives (e.g., when y=0). As seen in equation [3], determining the overall distribution for confidence scores h can be generally approached as a problem of estimating the parameters of a 2-component Gaussian mixture model ("GMM"): 1 component for the negatives 110, and another component for the positives 112. The parameters of each component can be estimated using expectation maximization ("EM"). FIG. 2 shows an example graph 200 of estimated Gaussian components for true positives and true negatives generated using the process described above. In FIG. 2, curve 210 represents the distribution of confidence scores (on the x-axis) for true positives. Curve 212 represented the distribution of confidence scores for true negatives. In some embodiments, other linear or non-linear distributions may be used or observed, such as sigmoid distributions, Poisson, and the like.

The optimization module 114 can use the distributions determined above (or some subset thereof) to estimate the false rejection rate, determine a detection threshold and/or determine other system parameter (e.g., a threshold for providing an input to a subsequent device, system, or process). Inputs with confidence scores that meet or exceed the threshold are "accepted," while those that do not meet the threshold are "rejected." The false rejection rate (the rate at which true positives are rejected) can be calculated by:

$$FRR=\int_{-\infty}^{\theta} p(h|\lambda^*_1;y=1)dh \quad [4]$$

where θ is the detection threshold and $\lambda^*_1$ represents the estimated model parameters for y=1. The optimization module 114 can therefore use equation [4] to estimate the false rejection rate for any given threshold θ, assuming the model parameters $\lambda^*_1$ have been adequately estimated. The detection threshold can then be programmed into or otherwise provided to the devices 116 that will use the detection module 104.

Validation

Although the process described above allows developers of detection systems to estimate false rejection rates at various detection thresholds, the distribution of actual confidence scores seen by deployed devices may change over time, or may not be adequately represented by the training data used above or model generated above. For example, the actual prior on usage of the wake word (e.g., p(y=1)) may be dependent upon the particular user that uses the system. In addition, a given user may use a wake word at different frequencies or rates depending upon various factors, such as time of day, day of week, or other environmental or contextual factors. As another example, the priors on the distribution parameters (e.g., $p(\lambda_1)$) may be highly variable depending upon the operational conditions that influences the accuracy of the detection module, such as speaker characteristics, environmental noise, user intent, etc. As a further example, different wake word detection approaches may have different functional forms suitable to model the confidence conditional probabilities (e.g., a sigmoid function may be more suitable for probabilistic support vector machine ("SVM") based detection).

In order to detect such variances, inaccuracies, and the like in deployed devices, a method of validating the distribution model and verifying model parameters for individual devices may be used. One approach is to temporarily lower the detection threshold for wake word detection confidence scores in order to obtain additional data from the device. Another approach is to use two different thresholds. Scores meeting or exceeding the detection threshold indicate that an event to be detected is present in the input data. A second threshold, which is independent of the detection threshold and which can be referred to as a transmit threshold, can also be implemented. Scores meeting or exceeding the transmit threshold indicate that the input data is to be transmitted to the server for annotation or other analysis. The additional data (e.g., data meeting the temporarily lowered detection threshold or data meeting the separate transmit threshold) can be annotated and the false rejection rate can be validated. Variances in the observed false rejection rate with respect to the estimated false rejection rate (e.g., calculated using equation [4]), or in the observed distribution model with respect to the estimated distribution model (e.g., calculated using equation [3]) can be detected. Adjustments to operational parameters (e.g., the detection model and/or one or more thresholds) of the detection module can be made in order to improve accuracy, reduce the false rejection rate, and otherwise improve detection performance.

Figure 3:
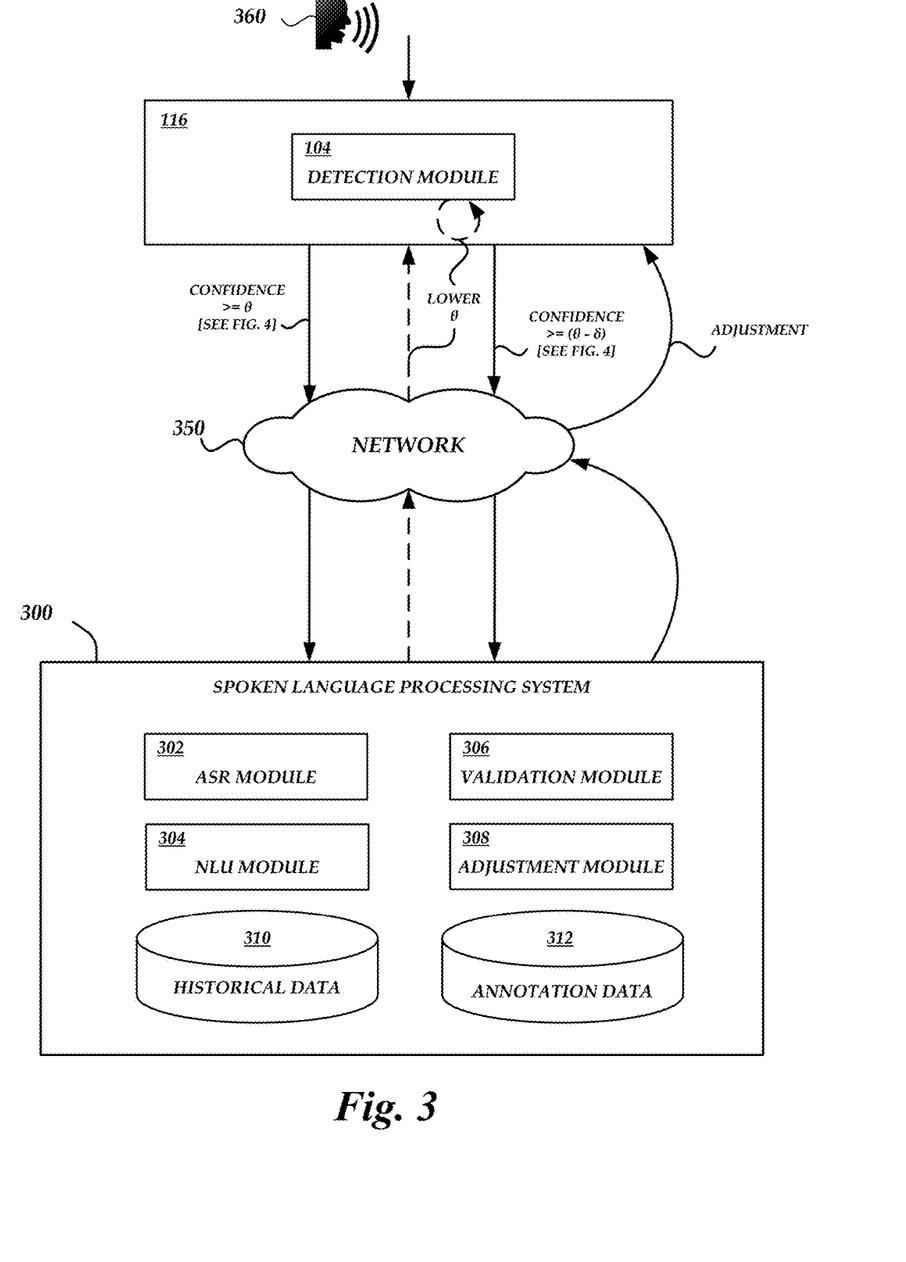
FIG. 3 is a block diagram of illustrative data flows that occur in some embodiments of confidence score model validation.

FIG. 3 illustrates an example environment in which such a process may be implemented. As shown in FIG. 3, a client device 116 deployed by a user 360 (e.g., at home, work, or some other desired location) may communicate with a spoken language processing system 300 via a communication network 350. For example, the client device 116 may provide audio data associated with a confidence score exceeding the detection threshold (thereby indicating that it likely includes the wake word) to the spoken language system 300 for processing. The spoken language processing system 300 may be configured to perform speech recognition on the audio data and executed the command spoken by the user, respond to the query spoken by the user, or perform some other process.

The communication network 350 may be any wired network, wireless network, or combination thereof. In addition, the network 350 may be a personal area network, local area network, wide area network, cable network, satellite network, cellular telephone network, or combination thereof. For example, the communication network 350 may be a publicly accessible network of linked networks, possibly operated by various distinct parties, such as the Internet. In some embodiments, the communication network 350 may be a private or semi-private network, such as a corporate or university intranet. The communication network 350 may include one or more wireless networks, such as a Global System for Mobile Communications ("GSM") network, a Code Division Multiple Access ("CDMA") network, a Long Term Evolution ("LTE") network, or some other type of wireless network. Protocols and components for communicating via the Internet or any of the other aforementioned types of communication networks are well known to those skilled in the art of computer communications and thus need not be described in more detail herein.

The client device 116 can correspond to a wide variety of electronic devices. In some embodiments, the client device 116 may be a computing device that includes one or more processors and a memory which may contain software applications executed by the processors. The client device 116 may include a microphone or other audio input component for accepting speech input on which to perform speech recognition. The software of the client device 116 may include components for establishing communications over wireless communication networks or directly with other computing devices. In addition, the client device 116 may include a detection module 104 for detecting the presence of a detection target (e.g., speech, face, handwriting, etc.) in input. The detection module 104 may be a hardware component or a combination of hardware and software (e.g., a software module executed by one or more processors). Illustratively, the client device 116 may be a mobile device, such as a mobile phone, wearable computing device (e.g., a "smart watch" or "smart eyewear"), personal digital assistant ("PDA"), mobile gaming device, media player, electronic book reader, tablet computer, laptop computer, or the like. In some embodiments, the client device 200 may be a substantially stationary device, such as a television with program execution capabilities and network connectivity (a "smart TV"), set-top box, gaming console, home entertainment system, desktop computer, server computer, or the like.

The spoken language processing system 300 may correspond to a logical association of one or more computing devices configured to provide automatic speech recognition and other computing services to user devices 116 and other entities. The spoken language processing system 300 can include an ASR module 302, a natural language understanding ("NLU") module 304, a validation module 306, an adjustment module 308, a historical data store 310, and an annotation data store 312. The purpose and operation of these modules and data stores is described in detail below. In some embodiments, the spoken language processing system 100 may include additional or fewer modules or components than illustrated in FIG. 3.

In some embodiments, the features and services provided by the spoken language processing system 300 may be implemented as web services consumable via a communication network 350. In further embodiments, the spoken language processing system 300 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In operation, a user 360 may make utterances that are captured by a microphone or other input component of the client device 116. The detection module 104 can calculate a confidence score for each portion of input indicating the likelihood that the input includes the wake word or other detection target. If the confidence score meets or exceeds a threshold θ, the input can be provided to the spoken language processing system 300. At the spoken language processing system 300, the ASR module 302 can receive and process audio input, performing speech recognition on the input. The ASR results may be provided to the NLU module 304, which can determine a semantic meaning from the recognized speech. Subsequently the spoken language processing system 300 or some other system can perform some task based on the semantic meaning.

At certain times, the spoken language processing system 300 may instruct the detection module 104 to lower its detection threshold, or may provide a new threshold to be used. Generally described, the detection threshold may be lowered (or a separate transmit threshold may be implemented) in order to collected data for analysis to improve performance of the detection module 104 and therefore to improve the user experience. For example, the threshold θ may be lowered by a small amount δ in order to allow an additional amount of input data to be provided to the spoken language processing system 300. The additional data can be annotated in order to verify that the estimated false rejection rate is accurate. In some embodiments, a separate transmit threshold may be applied, rather than a lowering of the detection threshold. The data corresponding to the confidence score range between θ−δ and θ may only be annotated, rather than processed by the ASR module 302 or other components along with input associated with a confidence score meeting or exceeding the detection threshold θ. In some embodiments, the detection module 104 may also, or alternatively, lower the detection threshold on its own, without instruction from the spoken language processing system 300.

Figure 4:
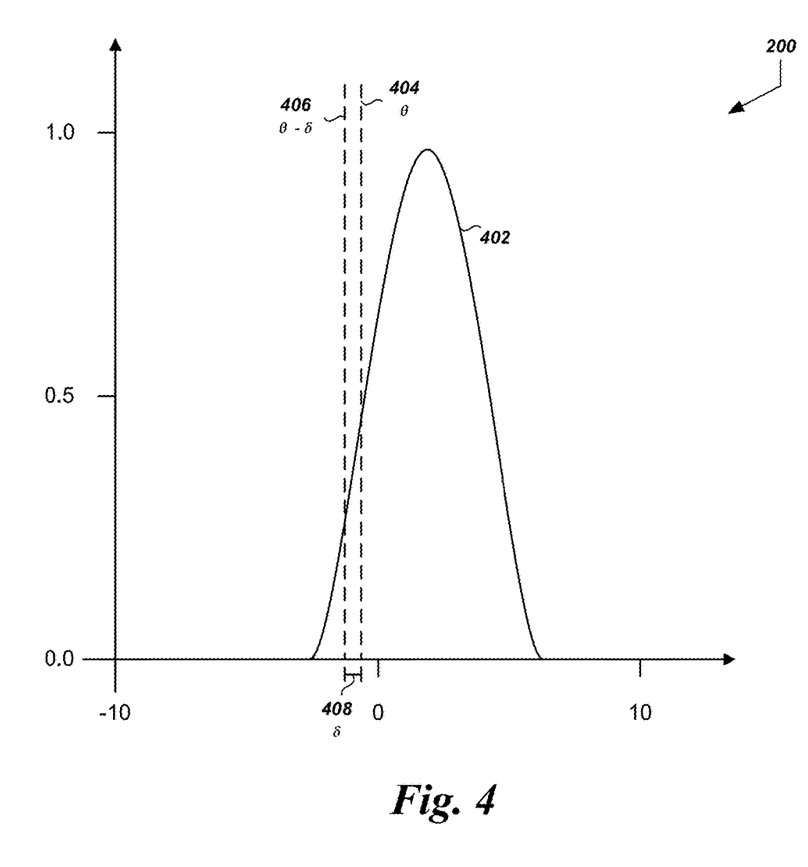
FIG. 4 is a graph of an illustrative confidence score distribution and various thresholds used in some embodiments.

FIG. 4 illustrates an example graph 400 of a distribution 402 of confidence scores, as described above. The detection threshold 404 is indicated by θ. During the time that additional data is accepted for annotation, the detection threshold 404 may be lowered by an amount 408 indicated by δ 408 to the temporary threshold 406, equal to θ−δ.

The threshold may be lowered on a schedule, at random times, or in response to some event. For example, if the spoken language processing system 300 determines that the actual distribution of confidence scores from a particular device 116 does not match the predicted model, then the device 116 may be instructed to provide additional input data. As another example, threshold may be lowered at random times to provide additional data with which to validate the current confidence score distribution model and estimated false rejection rate. As yet another example, the detection threshold may be lowered based on some schedule to improve performance, such as when different users use the device at different times, and each user is associated with a different threshold to provide improved results in comparison with a general detection threshold for all users.

The validation module 306 (or some other module or component of the spoken language processing system 300) can analyze the input data, including the additional data received due to the lowered threshold θ−δ, and validate the model distribution 308. If the model cannot be validated, or if some other criteria are met, then the adjustment module 310 can determine whether any adjustments to the detection module or other system components may be implemented. For example, the regular detection threshold θ of the detection module may be adjusted, the parameters of the distribution model may be adjusted, etc., as described in greater detail below with respect to FIG. 5.

Process for Validation and Adjustment of Operational Parameters

Figure 5:
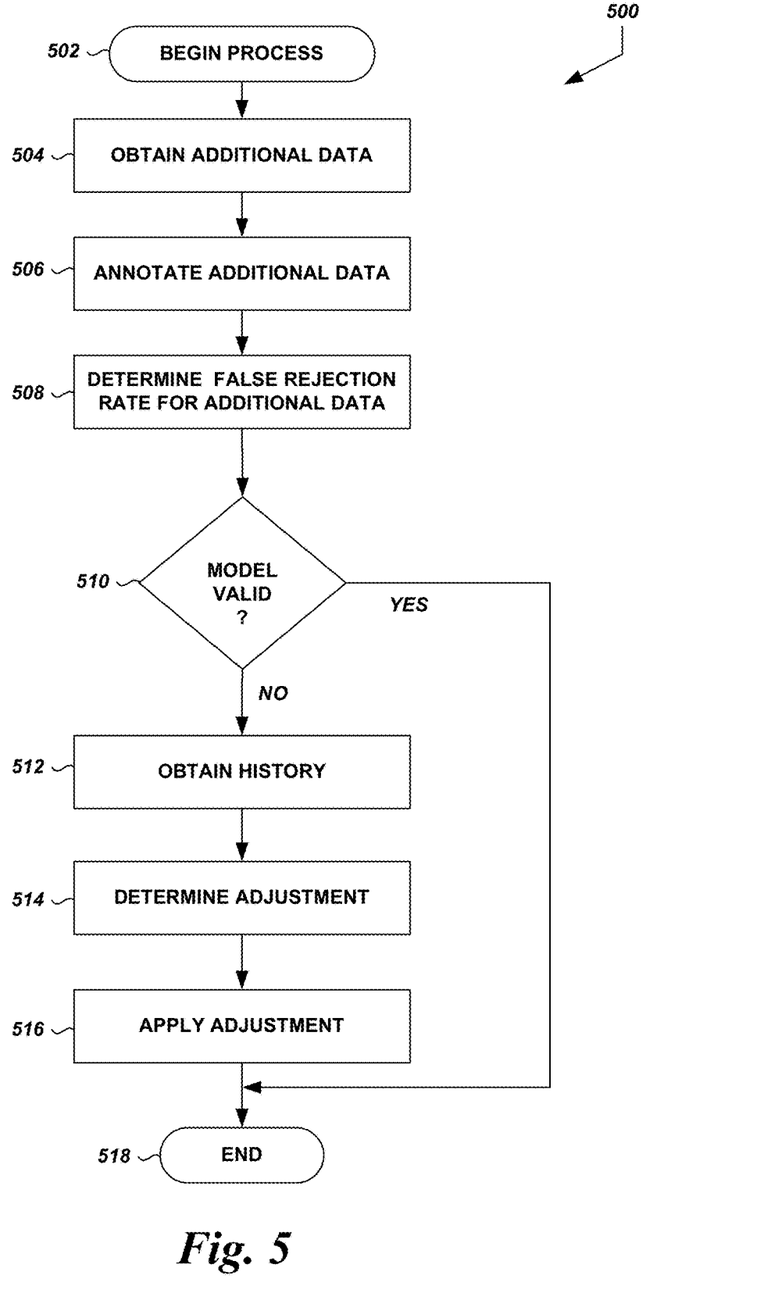
FIG. 5 is a flow diagram of an illustrative process for validating a confidence score model and making adjustments based on confidence score information.

With reference now to FIG. 5, a sample process 500 for obtaining additional input data for use in validating a previously generated model or for implementing adjustments to operational parameters of a detection system will be described. Advantageously, a validation module 306, adjustment module 308, and/or some other module or component of a spoken language processing system 300 may implement the process 300 to automatically adjust parameters of a detection system in order to improve perceived performance and overall user experience without requiring large amounts of data to be annotated and processed.

The process 500 begins at block 502. The process 500 may begin automatically upon receipt of audio input by a spoken language processing system 300, may be manually initiated by a system administrator or other user, may begin in response to some other event, or the like. The process 500 may be embodied in a set of executable program instructions stored on a computer-readable medium, such as one or more disk drives, of a computing device of the spoken language processing system 300. When the process 500 is initiated, the executable program instructions can be loaded into memory of a computing device and executed by one or more processors in communication therewith.

At block 504, the validation module 306 or some other module or component of the spoken language processing system 300 may obtain additional data from a client device 116. The additional data may be data associated with a confidence score below the original detection threshold θ and equal to or greater than the temporarily lower detection threshold (or temporary transmit threshold) θ−δ.

At block 506, annotators (e.g., staff or other individuals) can annotate the additional data, or some statistically significant portion thereof, in order to determine whether each portion of the data includes an actual instance of the detection target (e.g., the wake word). In some embodiments, annotation may be a wholly or partially automatic process. For example, an ASR module 302 may be used to annotate additional input data.

At block 508, the validation module 306 or some other module or component of the spoken language processing system 300 can determine the false rejection rate for the additional data received and annotated above. This observed false rejection rate may be obtained by summing the number of false negatives and dividing by the total number of input items in the additional data.

At decision block 510, the validation module 306 or some other module or component of the spoken language processing system 300 can determine whether the model on which the false rejection rate was originally determined is correct. The validation module 306 may do so by evaluating the accuracy of:

$$\delta FRR = \int_{\theta-\delta\theta}^{\theta} p(h|\lambda^*_1; y=1) dh \quad [5]$$

where $\delta FRR$ is the estimated false rejection rate for the additional data in the confidence range θ−δ to θ, calculated based on the previously estimated model parameters $\lambda^*_1$. If the observed false rejection rate for the additional data is within a satisfactory range of $\delta FRR$, then the model (and associated parameters $\lambda^*_1$) upon which the operational parameters of the detection module 104 have been based may be deemed to be valid. In this case, the process 500 may terminate at block 518. Otherwise, the process 500 may proceed to block 512.

At block 512, the validation module 306 or some other module or component of the spoken language processing system 300 can obtain historical data for use in determining an adjustment to the model or some operational parameter of the detection module 104. For example, data regarding prior adjustments may be obtained to determine whether (and the extent to which) they may have been successful in improving the accuracy of the model. As another example, data regarding particular usage habits associated with the client device 116 or users thereof may be obtained, such as times associated with increases in wake word processing and other system usage. Generally described, any information reflecting usage of the detection module 104 or client device 116 may be stored in the historical data store 310 or otherwise obtained for use in determining a potential adjustment.

At block 514, the adjustment module 308 or some other module or component of the spoken language processing system 300 can determine an adjustment to the confidence score distribution model or to some operational parameter of the detection module 104. In some embodiments, the model for confidence score distributions may be modified or replaced. For example, parameters of the model distribution of confidence scores for true positive samples can be adjusted to better model the observed distribution. This new model can then be used to estimate a more accurate false rejection rate and set a better performing detection threshold (e.g., one that does not produce as many false rejections). In other embodiments, the detection threshold may be modified for other reasons. For example, if the false rejection rate is unusually high, or the mean confidence score shifts a statistically significant amount (e.g., from 0.9 to 0.7 every day at 8:00 pm), the threshold may be lowered to capture more input for processing and/or annotation at the server. As another example, if the false rejection rate is low and the false acceptance rate is high, then the threshold may be raised to reduce the false acceptance rate. In additional embodiments, variable threshold configurations may be implemented. For example, different users may use the detection system at different times or on different days. In such cases, various parameters of the detection system, such as the detection threshold or confidence score distribution model, may be customized for the different users. As another example, the detection threshold or some other parameter of the detection system may be changed based on the context, such as during the first few seconds of playback of a requested song, etc.

At block 516, the adjustment determined above can be applied. The process 500 may then terminate at block 518.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a computer-readable memory storing executable instructions; and
one or more processors in communication with the computer-readable memory, wherein the one or more processors are programmed by the executable instructions to at least:
obtain a model for detecting a keyword in an audio sample and a detection threshold corresponding to the model, wherein a detection score greater than the detection threshold indicates that the keyword is present in the audio sample, and wherein the detection score is computed using the audio sample and the model;
determine an estimated false rejection rate, wherein the false rejection rate comprises an estimate of a probability that a received audio sample comprises the keyword and that a detection score for the received audio sample is less than the detection threshold;
obtain a transmit threshold for determining whether to transmit audio samples, wherein a detection score greater than the transmit threshold indicates that an audio sample for which the detection score is computed is to be transmitted to a server computing device, and wherein the transmit threshold is less than the detection threshold;
transmit the model, the detection threshold, and the transmit threshold to a client computing device, wherein the client computing device receives a first audio sample, computes a first detection score using the first audio sample and the model, determines that the first detection score is greater than the transmit threshold, and transmits the first audio sample to the server computing device based at least on the first detection score being greater than the transmit threshold;
obtain, from the client computing device, a plurality of audio samples, wherein each of the audio samples is associated with a detection score;
determine a false rejection rate using at least a portion of the plurality of audio samples;
determine, based at least in part on the determined false rejection rate, at least one of a second model or a second detection threshold; and
transmit at least one of the second model or the second detection threshold to the client computing device.

2. The system of claim 1, wherein the false rejection rate is determined based at least partly on data regarding listening, by a human, to at least a portion of the plurality of audio samples.

3. The system of claim 1, wherein the one or more processors are further programmed to determine the second threshold based on a desired number of additional audio samples.

4. The system of claim 1, wherein the one or more processors are further programmed to modify the model based at least partly on the detection scores associated with the plurality of audio samples.

5. A computer-implemented method comprising:
as implemented by a server system comprising one or more computing devices configured to execute specific instructions,
determining a transmit threshold, wherein a detection score satisfying the transmit threshold indicates that a sample corresponding to the detection score is to be transmitted to the server system, and wherein the transmit threshold is less than a detection threshold for determining whether an event is re resented in a sample;
transmitting the transmit threshold to a client computing device;
obtaining, from the client computing device, a plurality of samples associated with detection scores satisfying the transmit threshold, wherein at least a portion of the plurality of samples are associated with detection scores failing to satisfy the detection threshold, wherein a first detection score failing to satisfy the detection threshold indicates that an event is determined not to be represented in a first sample, and wherein the first detection score is computed using the first sample and a detection model;
determining a false rejection rate using at least the portion of the plurality of samples;
determining, based at least in part on the false rejection rate, at least one of a second detection model or a second detection threshold; and
transmitting at least one of the second detection model or the second detection threshold to the client computing device.

6. The computer-implemented method of claim 5, wherein the event comprises one of an occurrence of a keyword in audio data, an occurrence of a face in image data, or an occurrence of a written character in image data.

7. The computer-implemented method of claim 5, wherein determining the false rejection rate comprises computing an integration of estimated detection score probabilities for at least a portion of samples in which the event is present.

8. The computer-implemented method of claim 5, wherein the detection model comprises one of a Gaussian, Poisson, or sigmoid model.

9. The computer-implemented method of claim 5, wherein the detection model is based on parameters generated using maximum likelihood estimation.

10. The computer-implemented method of claim 5, wherein the false rejection rate is determined based at least partly on data regarding examining, by a human, at least a portion of the plurality of samples.

11. The computer-implemented method of claim 5, further comprising determining the second detection threshold based at least partly on a desired amount of additional samples.

12. The computer-implemented method of claim 5, further comprising determining a schedule for providing additional samples.

13. The computer-implemented method of claim 5, further comprising causing the client computing device to modify an operational parameter based at least partly on the false rejection rate.

14. The computer-implemented method of claim 13, wherein the operational parameter comprises one of the detection threshold, the transmit threshold, or a schedule for providing additional samples.

15. The computer-implemented method of claim 5, further comprising modifying a parameter for the detection model based at least partly on the detection scores associated with the plurality of samples.

16. The computer-implemented method of claim 5, further comprising modifying a prior probability distribution associated with the detection model based at least partly on the plurality of samples.

17. One or more non-transitory computer readable media comprising executable code that, when executed, cause a server system comprising one or more computing devices to perform a process comprising:
   determining a transmit threshold, wherein a detection score satisfying the transmit threshold indicates that an audio sample corresponding to the detection score is to be transmitted to the server system, and wherein the transmit threshold is less than a detection threshold for determining whether a keyword is re resented in an audio sample;
   transmitting the transmit threshold to a client computing device;
   receiving, from the client computing device, a plurality of audio samples and detection scores associated with detection of a keyword in each of the plurality of audio samples, the detection scores based at least partly on a first detection model, wherein the client computing device receives a first audio sample, computes a first detection score using the first audio sample and the first detection model, determines that the first detection score is greater than the transmit threshold, and transmits the first audio sample to the server system based on the first detection score being greater than the transmit threshold;
   generating a second detection model based at least partly on an analysis of one or more of the detection scores; and
   providing the second detection model to the client computing device, wherein the client computing device uses the second detection model to detect the keyword.

18. The one or more non-transitory computer-readable media of claim 17, wherein the process further comprises generating parameters for a detection score distribution model.

19. The one or more non-transitory computer-readable media of claim 18, wherein the process further comprises generating a prior probability distribution for audio samples in which the keyword is present based at least partly on data associated with the plurality of audio samples.

20. The one or more non-transitory computer readable media of claim 18, wherein the detection score distribution model comprises one of a Gaussian, Poisson, or sigmoid model.

21. The one or more non-transitory computer readable media of claim 18, wherein generating the parameters for the detection score distribution model is based on maximum likelihood estimation.

* * * * *

UNITED STATES PATENT AND TRADEMARK OFFICE
CERTIFICATE OF CORRECTION

PATENT NO. : 9,589,560 B1  
APPLICATION NO. : 14/135309  
DATED : March 7, 2017  
INVENTOR(S) : Shiv Naga Prasad Vitaladevuni et al.

Page 1 of 1

It is certified that error appears in the above-identified patent and that said Letters Patent is hereby corrected as shown below:

In the Claims

In Column 14 at Line 29, In Claim 5, change "re resented" to --represented--.

In Column 15 at Line 35, In Claim 17, change "re resented" to --represented--.

Signed and Sealed this
Twenty-fourth Day of April, 2018

Andrei Iancu
*Director of the United States Patent and Trademark Office*